April 28, 1942.　　M. A. SCHWARTZ　　2,281,386
THERMOSTATIC CONTROL
Filed April 2, 1940
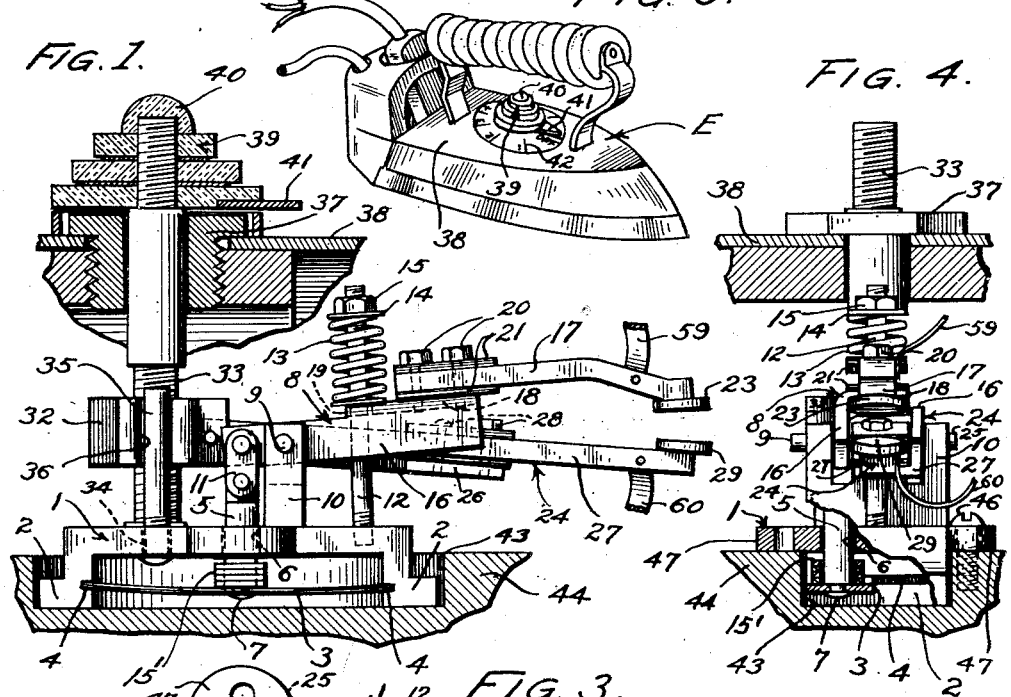
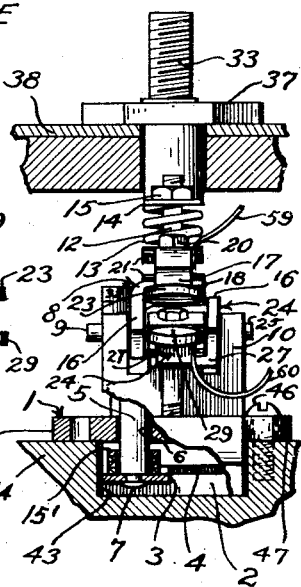
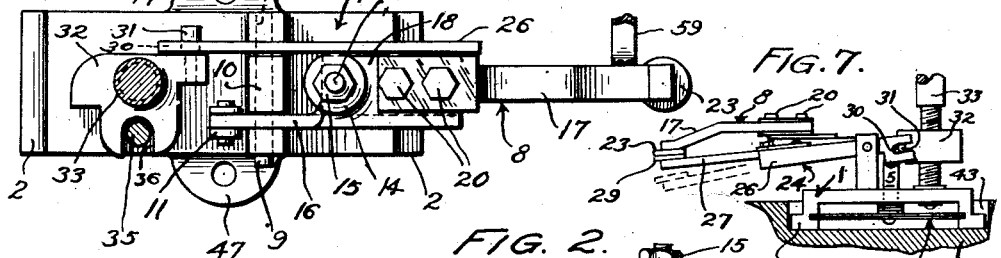
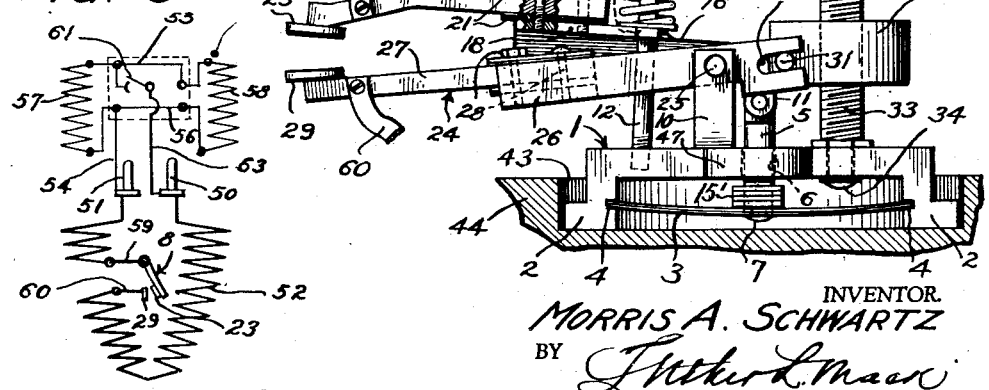
INVENTOR.
MORRIS A. SCHWARTZ
BY
ATTORNEY.

Patented Apr. 28, 1942

2,281,386

UNITED STATES PATENT OFFICE 2,281,386

THERMOSTATIC CONTROL

Morris A. Schwartz, Los Angeles, Calif.

Application April 2, 1940, Serial No. 327,448

7 Claims. (Cl. 200—138)

This invention relates to improvements in thermostatic control devices for opening and closing electric circuits responsive to predetermined temperatures, as for example, the heating element circuit of an electric iron.

I am aware of thermostatic controls for electric irons which control the current responsive to predetermined temperatures to prevent overheating of the iron and provide for operation thereof at temperatures best suited to the particular work in hand. These thermostatic controls will, over a period of time, accurately shut off the current when the iron has reached a predetermined temperature in accordance with the setting of the thermostat, but due to certain features of the construction and operation as will be hereinafter pointed out, there is often too great a drop in temperature (sometimes 70 degrees) between the time the thermostat shuts off the current and its subsequent operation to turn on the current, with the result that the iron becomes underheated and cannot be efficiently used. In the case of electric irons which generate steam to be administered to the work through the sole plate, it is apparent that if the temperature of the iron drops below the steam generating point, for example 212 degrees Fahrenheit in between the time that the thermostat has opened and closed the circuit, the steam will condense and the iron will not have the proper ironing temperature.

It is now apparent that a thermostat control which will operate to turn on and off the current within small temperature range and maintain the temperature above the boiling point, is highly desirable in steam electric irons; and it is therefore the primary purpose of my invention to provide a thermostatic control or more specifically, a thermostatically controlled switch which will shut off and turn on the current at predetermined temperatures within a range such that if the thermostat for example, is set for shutting off the current at 250 degrees, or at any point say 20 or more degrees above 212 degrees Fahrenheit, it will again turn on the current before the temperature will have dropped below the boiling point—to wit: 212° F.; although my thermostat may be operated with a differential of from 10 to 15 degrees more or less, if desired.

Another purpose of my invention is to provide a thermostat control device of the character described in which a novel construction and leverage system affords a quick opening and closing of the circuit controlled thereby without depending upon a snap action of the thermostat element, and therefore makes possible an efficient and accurate use of the thermostat over long periods of time as against a thermostat which, due to being heated at each operation and depending upon a snap action, will in time lose its temper and therefore fail to produce the necessary snap motion and become inaccurate as to response to temperatures within the desired limits.

Another purpose of my invention is to provide a thermostat switch of the character described which is simple as to construction, rugged, capable of reliable use over long periods of time and adjustable in a novel manner so as to operate accurately over a wide range of temperatures.

With the foregoing and other objects in view, my invention consists in the particular construction of, combination and relative arrangement of the parts and elements as shown in the accompanying drawing, described in the following specification and finally defined in the claims thereto appended. It is to be understood that minor changes as to size, proportion and arrangement of parts and elements of the invention may be made as required without departing from the spirit and scope of the invention as set forth in the claims hereof.

In the drawing:

Fig. 1 represents an enlarged fragmentary vertical sectional view showing for the most part, in side elevation, a thermostat control device embodying my invention and as when installed, for example, in an iron, the switch being open;

Fig. 2 represents a fragmentary side elevation of the opposite side of the control device as shown in Fig. 1, with parts omitted and other parts in section for clarity of illustration;

Fig. 3 represents a top plan view of the device as shown in Fig. 1, with parts removed and other parts in section for clarity of illustration;

Fig. 4 represents a front elevation of the mechanism as shown in Fig. 1, parts being broken away and other parts shown in section;

Fig. 5 is a diagrammatic view of an electric circuit of a steam electric iron as when controlled by means of a thermostatic device embodying my invention;

Fig. 6 is a perspective view of a steam electric iron as equipped with the thermostatic control means of my invention.

Fig. 7 is a fragmentary elevational view of the control device with parts in section and other parts removed for the sake of clarity; showing the contacts as when engaged in full lines and illustrating in dashed lines the separation of the contacts as may be effected through the main adjusting means.

The embodiment of my invention shown in the accompanying drawing comprises a metal frame or base including an elongated body 1 having feet 2 depending from the ends thereof; an elongated thermostatic element 3 having its ends fitted in slots 4 in said feet; a vertical stem 5 slidably in an aperture 6 in the body and fixed at its lower end as at 7 to the element 3; an operating lever 8 pivoted at 9 on a post 10 on the body, and a link 11 pivotally connecting one end of the lever with the upper end of the stem. A post 12 is threaded at its lower end to the base and retains thereon a spring 13 having one end contacting the lever 8 and the other engaged with a washer 14 adjustable by means of a nut 15 whereby to vary the tension of the spring. Washers 15' on stem 5 limit the upward movement of said stem and element 3.

It should be noted that the lever 8 is pivoted close to the point of its connection of one end thereof with the link 11, whereby but a small movement of said end will effect a relatively great movement of its other end. In view of this ratio it is seen that the bi-metal thermostat which bows downwardly, responsive to heat, will only have to effect a small movement in order to rock the lever so that the free or outer end of the lever will move quickly over a relative large arc. This action is substantially equivalent to a "snap" movement as commonly employed for operating circuit closers or valves.

The device of my invention as hereinbefore described comprises an operative entity for actuating circuit closers or valves with the advantage of accuracy of performance and long life, due to the fact that no spring or snap action of the thermostatic element is depended upon to operate lever and the continued heating of said element does not impair its use. Moreover the spring 13 is positioned so as to be protected from the heat since it is well above the thermostat and source of heat. In this connection it should be noted that spring 13 may be employed to assist the thermostat in rocking the lever 8 when placed under tension as by adjusting the nut 15, or as will be hereinafter described, in that said spring will resist the movement of the lever upon the downward bowing of the thermostat responsive to increasing temperature and therefore will assist in the return movement of the lever as when the thermostat returns incident to decrease in temperature. Due to the latter action of the spring, it is seen that objectionable lag of the return or reduced temperature movement thereof will be prevented, wherefore the circuit closing or equivalent action of device will take place without too great a drop in temperature of the iron or other heated device which is controlled by the thermostat. This action is regulatable by varying the tension of the spring through adjustment of nut 15 and by other means to be hereinafter described.

As shown, lever 8 comprises a main section 16 and an outer section 17 which is secured to a flange 18 on the outer end of section 16. The spring 13 bears upon this flange and the post 12 is engaged in a notch 19 in said flange as seen in Figs. 2 and 3. Screws 20 secure the sections 16 and 17 together and hold insulation strips 21 therebetween whereby the outer section 17 may be used as one element of a switch and is therefore provided on its outer end with a contact member 23.

In the present form of my invention, a lever 24, similar to lever 8, is pivoted as at 25 near one end, to the post 10 and lies in part, to one side of and substantially parallel with lever 8. Lever 24 has sections 26 and 27 secured by fastenings 28 and insulated from one another in the same manner as lever 8 and is also provided at its outer end with a contact member 29 adapted to lie beneath and be contacted by the member 23. It is seen that the main sections 16 and 26 of levers 8 and 24 are spaced apart laterally whereas the end sections 17 and 27, in being offset inwardly from sections 16 and 26 and in having the section 17 above section 27, will lie one above the other whereby the contacts 23 and 29 may be moved into and out of engagement upon the rocking of lever 8 on its pivot 9.

Lever 24 is adapted to be adjusted and set in adjusted positions to vary the operation of the device responsive to different temperatures, by a means to be now described.

As here provided, the pivoted end of lever 24 is enlarged and formed with an end opening slot 30 (Fig. 2) adapted to receive a pin 31 on a nut 32. This nut is vertically adjustably threaded on an adjusting screw 33 which has its lower end rotatably anchored as at 34 on the body 1. The nut 32 will be moved up or down depending on the direction of turning of the screw 33, and a guide post 35 fixed on the body 1 and engaging in a notch 36 in the nut prevents turning of the latter, whereby the nut will be vertically moved as aforesaid. In the present embodiment, the screw 33 is extended through a bushing 37 which is threaded in the housing or shell 38 of an electric iron E (Fig. 6). A heat-proof laminated handle 39 is fixed by means of a nut 40 on the upper end of the screw 33 above the housing 38, and when turned, likewise turns the screw for moving the nut 32 whereby to rock the lever 24 so as to position the contact 29 as desired with relation to contact 23. A pointer 41 on the handle cooperates with graduations 42 on housing so that the screw and contact 29 may be adjusted in degrees of temperature and the thermostatic device set to operate the switch a predetermined temperature.

One way of incorporating my control device with an electric iron such as here shown consists in seating the frame, consisting of body 1 and legs 2 in a depression 43 (Fig. 1) in the heating plate 44 of the iron, said plate having the electric heating element (not shown) either embedded therein or disposed adjacent thereto, as is the common practice in the art. The screws 46 and ears 47 serve to hold the body 1 and feet 2 in place, with the thermostat 3 directly exposed to heat from the plate 44 whereby it will be effectively responsive to the heat of the iron. The switch levers 8 and 24 and associated elements are disposed well above the plate 44 in the air space between said plate and the top of the housing 38, whereby to be protected from injury by the heat of the iron.

In Fig. 5, is shown a wiring diagram for a steam generating electric iron as controlled by means of the thermostatic device of my invention. Leading from the contact posts 50 and 51 of the iron, to which posts, the ends of the main heating element 52 are connected, are conductors 53 and 54 which are respectively connected to conductors 55 and 56 in turn connected across the ends of the steam generator heating elements 57 and 58.

The contact members 23 and 29 of the thermostatic switch are connected by means of conductors 59 and 60 in series with the main heating element for controlling the latter in accordance with my invention. A manual switch 61 may be connected in the conductor lines 63 for controlling the steam generating unit.

It is now seen that with the iron "cold" the contacts 23 and 29 are engaged and the thermostatic control is ready for operation. By means of handle 29, the screw 33 may be turned to adjust the nut 32 and thereby rock lever 24 to set the contact 29. If the contact 29 is raised, it pushes the contact 23 upwardly and likewise lifts the lever 8 against the tension of spring 33. As the lever 8 is thus lifted it pushes downwardly on the stem 5 through link 11 and thereby tends to bow the thermostatic element 3 downwardly from its normal position so that under such increased tension or if actually downwardly bowed by this adjusting pressure, it will respond much more readily to a lower temperature for raising the lever 8 and opening the switch, than if such adjustment had not been made. Upon lowering contact 29 through appropriate manipulation of handle 29 and screw 33, the contact 23 and lever 8 are also lowered and the tension on spring 33 is reduced wherefore a greater temperature is required to actuate the thermostat to raise lever 8 and open the switch. This adjusting means is calibrated so that upon movement of the pointer 41 to the desired temperature graduation, the switch will operate at the selected temperature.

It should be noted that the tension of spring 33 is increased as by raising the contact 29 as aforesaid, through the operation of screw 33 or upon screwing down the nut 15, the increased spring tension will bring about a quicker return of the thermostat to its set position for closing the switch, following an operation thereof to open the switch, and in this manner, I am able to eliminate an objectionable lowering of the temperature of the iron between opening and closing operations of the switch, I may set the device for operation on a 10 degree temperature differential or within a lesser or greater range as desired and in all instances may readily prevent such great loss of temperature as would reduce the heat of the iron below 212° F.

Regardless of the setting of the device, the long leverage afforded the lever 8 insures a quick and relatively great movement of contact 23 towards and away from contact 29 upon a slight movement of the thermostat 3 wherefore to prevent such arcing as would burn or damage the contacts.

Inasmuch as the thermostat here shown and described, is substantially identical as to certain parts and features, with the thermostat forming a part of my application for patent entitled Steam electric irons, filed November 13, 1939, Serial No. 303,975, the present application is a continuation-in-part of said earlier application.

It should be noted that the adjusting screw 33 makes possible the adjustments indicated, particularly in Fig. 7, such that, for example, as shown in full lines in said figure, the contacts will normally engage one another or as shown in dashed lines, the lower contact 29 may be giving maximum adjustment so that it is free of engagement with the contact member 23. If it is desired to render the thermostatic device inoperative, this latter adjustment is made and the lower contact will then be in the position as shown by the dashed lines in Fig. 7, spaced well below contact 23. In this connection, it should be noted that the dial on the top of the iron has an "Off" designation and that the maximum adjustment shown by the dotted lines in Fig. 7 can be obtained by moving the pointer 41 to such designation.

What I claim is:

1. In a thermostatic control, a base member, a thermostatic element mounted on the base member, a pair of levers fulcrumed on said base so that their fulcrums are close to adjacent ends thereof and having engageable contacts on their other ends, means for operatively connecting an end of one of the levers and the thermostatic element, spring means resisting movement of one of said levers in one direction.

2. In a thermostatic control, a base member, a thermostatic element mounted on the base member, a pair of levers fulcrumed on said base so that their fulcrums are close to one of the ends thereof and having engageable contacts on their other ends, means for operatively connecting an end of one of the levers and the thermostatic element, spring means resisting movement of one of said levers in one direction.

3. In a thermostatic control, a base member, a thermostatic element mounted on the base member, a circuit closing lever fulcrumed on said base so that its fulcrum is close to one end thereof and having a contact on its other end, means for operatively connecting an end of the circuit closing lever and the thermostatic element, spring means resisting movement of said lever in one direction, and control means associated with the other end and operating in response to movement of said lever, said control means including a second lever fulcrumed on the base and having a contact engageable with the contact on said circuit closing lever, and means for adjusting the second lever for regulating the operation of said control means.

4. In a thermostatic control, a base member, a thermostatic element mounted on the base member, a lever fulcrumed on said base so that its fulcrum is close to one end thereof, means for operatively connecting said end of the lever and the thermostatic element, spring means resisting movement of said lever in one direction, and control means associated with the other end and operating in response to movement of said lever, said control means including a second lever fulcrumed on the base and having a contact thereon, a contact member carried by the first lever and adapted to be moved towards and away from the contact member of said second lever upon movement of the first named lever, and means for adjusting the second named lever so as to selectively space its contact relative to the contact on the first lever to regulate the action of said control means.

5. In a thermostatic control, a base, a thermostatic element supported thereby, a lever fulcrumed on the base with its fulcrum closely spaced from one end thereof, means connecting said end of the lever with the thermostatic element for rocking the lever responsive to the movement of the thermostatic element, spring means associated with the lever for resisting its movement in one direction and assisting its movement in the opposite direction, a contact member on the other end of said lever, a second lever pivoted on the base, a contact member on the second lever adapted to be engaged by the contact on the first lever, adjusting means for moving the second named lever, whereby to move between the contacts into different positions for controlling the making and breaking action thereof.

6. In a thermostatic control, a base, a thermostatic element supported thereby, a lever fulcrumed on the base with its fulcrum closely spaced from one end thereof, means connecting said end of the lever with the thermostatic element for rocking the lever responsive to the movement of the thermostatic element, spring means associated with the lever for resisting its movement in one direction and assisting its movement in the opposite direction, a contact member on the other end of said lever, a second lever pivoted on the base, a contact member on the second lever adapted to be engaged by the contact on the first lever, adjusting means for moving the second named lever, whereby to move between the contacts into different positions for controlling the making and breaking action thereof, said control means including an adjusting screw rotatable on the base, a nut mounted on the screw, means for holding said nut against rotation, means for rotating said screw, and means of operative connection between the nut and the second named lever.

7. In a thermostatic control, a base member, a thermostatic element mounted on the base member, a lever fulcrumed on said base so that its fulcrum is close to one end thereof, means for operatively connecting said end of the lever and the thermostatic element, spring means resisting movement of said lever in one direction, and control means associated with the other end and operating in response to movement of said lever, said control means including a second lever fulcrumed on the base and having a contact member thereon, a contact member carried by the first lever and adapted to be moved towards and away from the contact member of the second lever upon movement of the first named lever, and means for setting the second named lever and contact thereon in different positions to regulate the action of said control means, said last named means being operated for adjusting the second named lever to move the contact thereof out of engagement with the first named contact member and so maintain it to render the thermostatic control inoperative.

MORRIS A. SCHWARTZ.